May 24, 1955   J. E. VOYTILLA   2,709,139
STERILIZATION PROCESS
Original Filed July 5, 1951   2 Sheets-Sheet 1
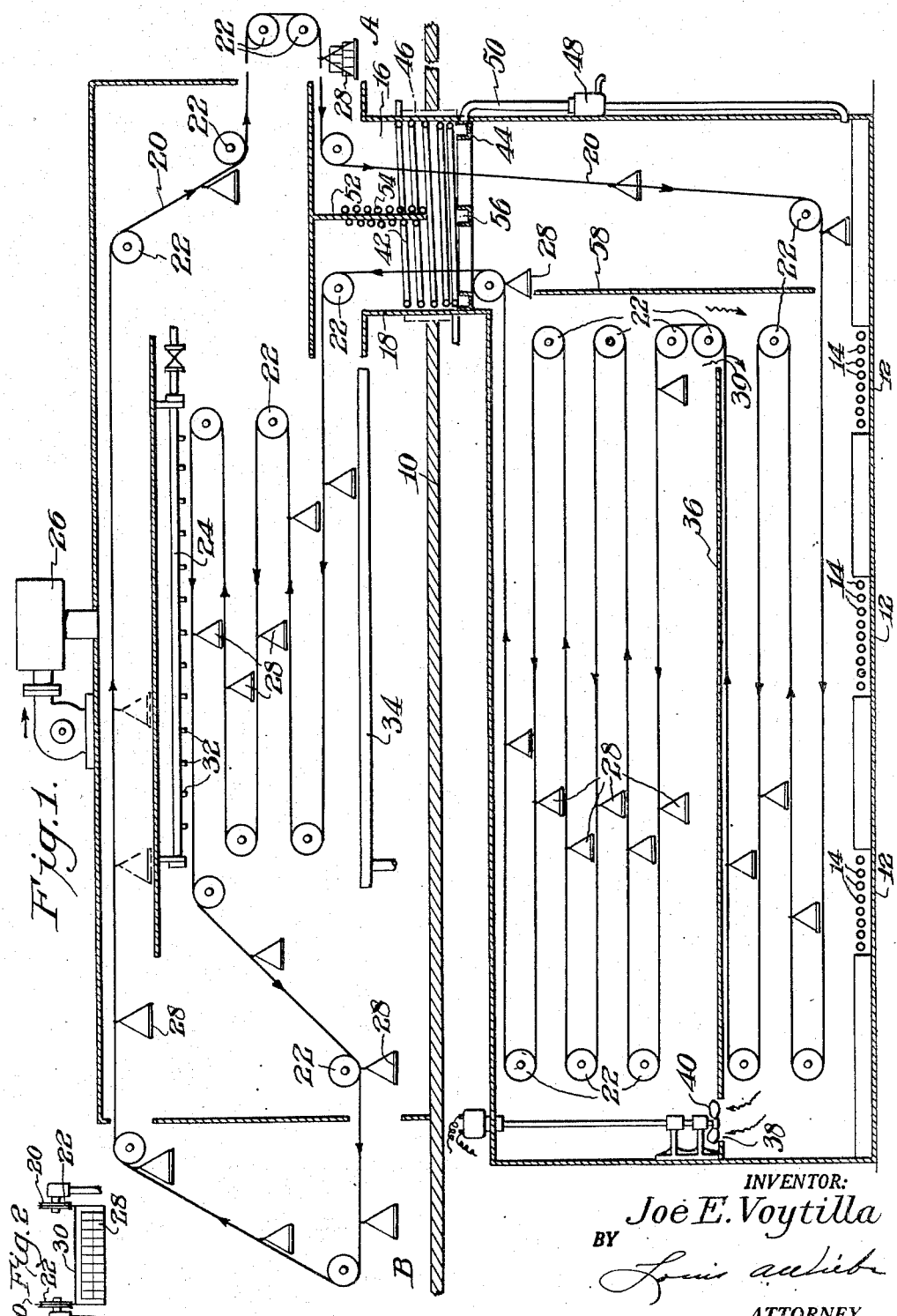
INVENTOR:
Joe E. Voytilla
BY
ATTORNEY.

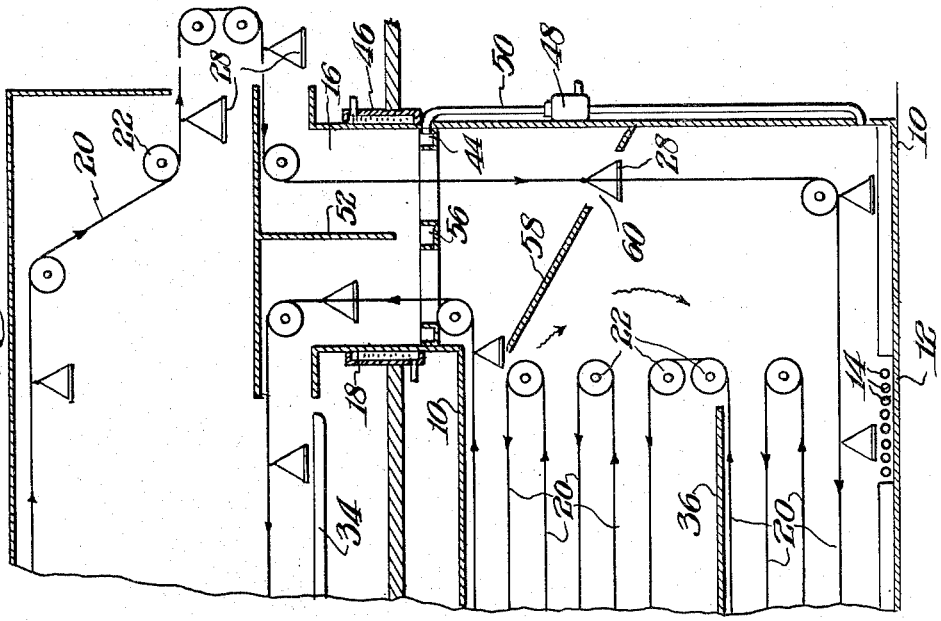
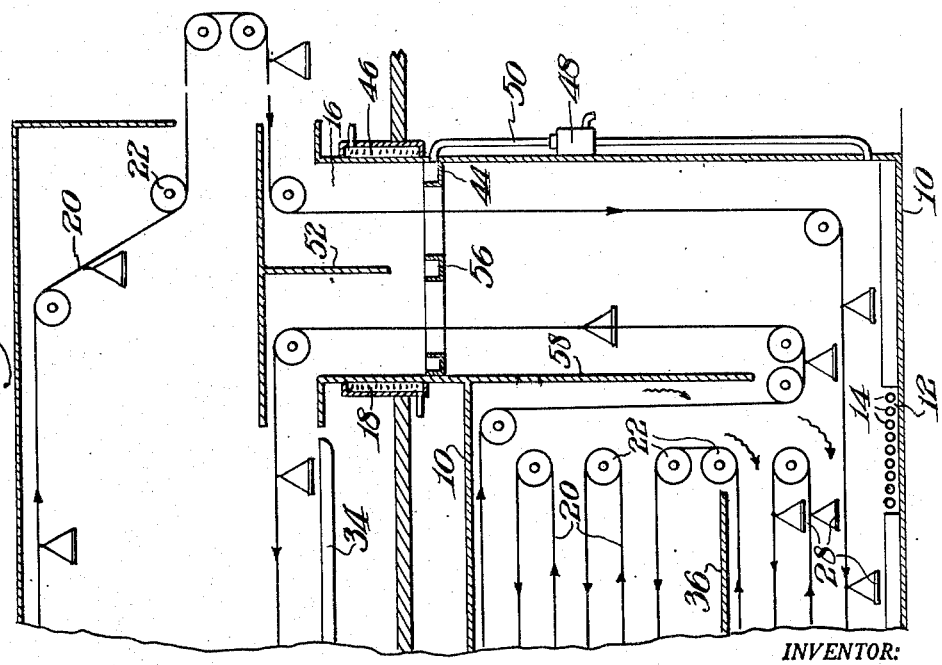

United States Patent Office 2,709,139
Patented May 24, 1955

2,709,139

STERILIZATION PROCESS

Joe E. Voytilla, Kennett Square, Pa., assignor to E. I. du Pont de Nemours and Company, Wilmington, Del., a corporation of Delaware Original application July 5, 1951, Serial No. 235,274. Divided and this application December 15, 1951, Serial No. 261,855

3 Claims. (Cl. 99—214)

This invention relates to a process and apparatus for the sterilization of canned goods, and more particularly it relates to such process and apparatus for the sterilization of canned goods by means of a hot vapor mixture of trichloroethylene and perchloroethylene.

This application is a division of my copending application Serial No. 235,274, filed July 5, 1951.

Until comparatively recently, canned goods such as canned food stuffs have been cooked or sterilized by means of steam under pressure, the desired sterilization temperature being obtained by careful control of the steam pressure. Great difficulty has long been experienced in operating such a system in a continuous manner by reason of the pressure under which the steam must be maintained to obtain the requisite temperature of sterilization.

Attempts have been made to cook and sterilize canned goods with a sterilization medium having the desired boiling temperature at atmospheric pressure. Good results have been obtained by using a mixture of perchloroethylene and trichloroethylene. Perchloroethylene has a boiling temperature of about 121° C. and trichloroethylene a boiling temperature of about 87° C., at atmospheric pressure at sea level. These materials can be mixed in varying proportions to obtain compositions having any boiling point at atmospheric pressure between the boiling points of the individual materials. Generally, canned foodstuffs are cooked and sterilized at a temperature between about 100° C. and 120° C., different foodstuffs being sterilized at different temperatures within this range.

Considerable difficulty has been experienced in the use of mixtures of trichloroethylene and perchloroethylene when used in sterilizing equipment in which the canned goods are being continuously moved into and out of contact with the sterilizing medium. As the mass of canned goods moves through the sterilizing chamber there is found to be a greater condensation of the perchloroethylene than of the trichloroethylene by reason of the higher boiling point of the former. Moreover, the greater rate of condensation of the perchloroethylene differs very materially in different sections of the chamber. As a result of this difference in condensation rates between these two materials, the temperatures in various sections of the sterilization chamber vary to a considerably greater extent than can be tolerated.

Previous attempts to control and equalize the temperature of the mixed vapors throughout the sterilization chamber have not been satisfactory. It has been suggested to boil up a great excess of the mixture of materials with the object of maintaining a substantially uniform temperature of the mixed vapors in the chamber. This necessitates an excessive and expensive heat input as well as an excessive expenditure in condensing a large amount of vapors at the chamber outlet to prevent loss of the vapors to the atmosphere. It has also been suggested to provide the chamber with vapor inlets at different sections and levels with the result that thermostatic control instruments were needed in many parts of the chamber to obtain uniformity of temperature through the same.

It is an object of this invention to provide a new and simplified method of obtaining a uniform temperature in a cooking and sterilizing chamber in which canned goods are sterilized in a continuous manner with a mixture of trichloroethylene and perchloroethylene vapors.

It is another object of this invention to provide a new and simplified apparatus for obtaining a uniform temperature in the continuous cooking and sterilization of canned goods with such a mixture of vapors.

Other objects of this invention will appear hereinafter.

These objects are accomplished by continuously moving the canned goods through a vapor condensation zone open to the atmosphere into and out of a cooking or sterilization zone containing a desired mixture of trichloroethylene and perchloroethylene vapors at the approximate boiling temperature of this mixture, and forcing the vapors in the sterilization zone in a circular path alternately through the upper and lower parts thereof to maintain the vapor mixture at a substantially constant composition throughout.

The details of the invention will be more clearly apparent by reference to the following description when taken in connection with the accompanying drawings in which:

Fig. 1 is a diagrammatic sectional view of one embodiment of apparatus constructed in accordance with the invention;

Fig. 2 is a side elevational view of a canned goods tray showing the manner in which the same can be fastened to a pair of continuous conveyor chains;

Fig. 3 is a diagrammatic sectional view of a portion of the apparatus shown in Fig. 1 showing a modified form of baffling to avoid objectionable disturbance of the air-vapor interface at the inlet to the sterilization chamber; and Fig. 4 is a diagrammatic sectional view of a portion of the apparatus shown in Fig. 1 showing another modified form of such baffling structure.

Referring to the drawings, 10 designates a sterilization chamber which is provided with a plurality of sumps 12 in which heating elements, for example, electrical resistance elements or steam coils, are positioned to boil a given mixture of perchloroethylene and trichloroethylene. A passageway 16, defined by walls 18, is provided adjacent one end of the chamber 10.

A pair of continuous conveyor chains 20, guided by pairs of chain-guide pulleys 22, are positioned to pass from a loading station A through passageway 16 to the lower part of chamber 10, back and forth through the chamber to the upper part thereof, then from said chamber through passageway 16 to a series of passes under a water cooler 24 to an unloading station B, under a hot air blower 26 and back to loading station A.

Canned goods trays 28 may be fastened to the pair of chains 20 as clearly shown in Fig. 2. The trays are pivotally mounted on the chains 20 in a known manner so that they will remain in an upright position in their travel through the apparatus on these chains. A brace rod 30 may be connected to the pivot mounting elements (not shown in detail) to aid in maintaining the chains on their respective pulleys. One or more pairs of said pulleys may be driven in any desired manner to motivate said chains. Any desired design and construction of trays and conveyor apparatus that will function to move canned goods in a continuous fashion into, through, and out of a sterilization chamber may be used equally as well as the particular design and structure shown, and applicant makes no claim to any invention of conveyor structure.

The water cooler 24 may be comprised of any desired apparatus for cooling the trays of canned goods, for example, air cooling, water spray cooling, or refrigerating apparatus of any design may be used for this purpose. As shown, the cooler comprises a series of water spray nozzles 32 and a catch pan 34 to catch and drain the water dripping from the cans and trays.

Preferably, the trays are dried before reloading the same with canned goods. For this purpose, drying equipment of any desired design may be employed. As shown, a hot air blower 26 is employed to blow heated air into direct contact with the wet trays.

Passageway 16 is provided, adjacent the walls 18 thereof, with condensing coils 42 or cooling jackets 46, or both, for the purpose of condensing trichloroethylene and perchloroethylene vapors that tend to rise upwardly through this passageway. These condensing coils or cooling jackets must have sufficient cooling capacity to prevent a flow of the vapors from the top of passageway 16. A condensate catch trough 44 is positioned near the bottom of the passageway 16 to catch and remove the liquid condensate. Such condensate will unavoidably contain some water which may, if necessary, be conveniently removed in a conventional decanting or separating device 48 in a conduit 50 leading from catch trough 44 to the bottom of the chamber 10. The liquid condensed trichloroethylene and perchloroethylene will run into sumps 12 along the bottom of chamber 10.

Despite all precautions for preventing loss of the vapors of trichloroethylene and percholoroethylene from the top of passageway 16, slight amounts of the vapors will unavoidably diffuse into the atmosphere above the passageway. The escape of these vapors is accentuated by the continuous movement of trays of canned goods into and out of the passageway 16. It has been found that such escape of vapors by diffusion can be minimized by placement of a baffle 52 from a point immediately above the passageway 16 to a point projecting through the air-vapor interface within the condensing means 42 or 46. If desired, this baffle may be provided with additional condensation means 54, in which case a catch trough 56, connecting with catch trough 44, may be provided to catch the condensate dripping therefrom. Since the vapors of trichloroethylene and perchloroethylene are much heavier than air, the baffle 52 functions to effectively block the passage of air from the space in which the conveyor passes into the passageway 16 to the space in which the conveyor passes from said passageway. By blocking these two spaces from each other, the movement of air across the same is prevented and thereby the diffusion of trichloroethylene and perchloroethylene vapors into the atmosphere is greatly reduced.

The cooking and sterilizing chamber 10 is provided with a partition 36 dividing the chamber into upper and lower sections. Partition 36 has vapor passageways 38 and 39 adjacent opposite ends thereof. These passageways may be defined by openings in the partition or by a space left between the partition and adjacent elements or walls of the chamber.

A fan 40 is positioned in at least one of these vapor passageways 38 or 39 to force the heated vapors into a circular path alternately through the upper and lower sections. As shown, the fan motor is mounted outside of chamber 10 to avoid subjecting the motor to the heat in the chamber. If desired, the fan 40 may be mounted in a chamber extension with passageways leading from the lower to the upper sections of the partition, thus providing a vapor passageway at one end of the partition 36. Other known vapor forcing means, for example, pumping means, blower means, or the like, may be provided in place of the fan for forcing the vapors in said circular path.

A baffle 58 is positioned in the chamber 10 between the portion of the chamber adjacent passageway 16 and the remaining portion of the chamber. This baffle cannot, of course, entirely block off the passageway 16 from the chamber 10 because of the necessity for continuous movement of the conveyor and trays of canned goods. The baffle is, however, made sufficiently large in area to block off the major part of the area between the portion of the chamber 10 adjacent the passageway and the remaining portion of the chamber.

Heretofore, it was not considered feasible, or possible, to force the sterilizing vapors in a circular path around said chamber in an open, continuous sterilization system without excessive loss of the vapors by forcing the same from the open system or as a result of disturbing the interface between the air and vapors in the condensation area. It has now been found that such forcing of the vapors in circulation may be accomplished without objectionable disturbance to the air-vapor interface if the baffle 58 is sufficiently large to block off the major part of the area between the aforesaid two chamber portions, and if passageways such as 38 and 39 are provided adjacent opposite ends of baffle 36.

The portion of the sterilization apparatus shown in Fig. 3 and Fig. 4 show two alternative positions of baffle 58 to block off from each other the two adjacent chamber portions. In Fig. 3 the conveyor and trays of canned goods pass underneath baffle 58, both on their travel to and from chamber 10, to permit the baffle to be connected directly to the top wall of the chamber 10. In Fig. 4, the baffle 58 is positioned diagonally across the end of chamber 10 adjacent to passageway 16, and the baffle is provided with an opening 60 through which the conveyor travelling to the chamber 10 may pass.

It is not essential that the conveyor and trays of canned goods be passed first into the lower section of the chamber 10 then through the upper section thereof as shown in the drawings. This arrangement can, of course, be reversed to first traverse the upper section and then the lower section of the chamber. Moreover, it is not essential that the trichloroethylene and perchloroethylene vapors be generated in chamber 10 but these vapors may alternatively be generated elsewhere and led into the chamber.

The cooking and sterilizing of canned goods with the apparatus above described may be carried out as follows:

Liquid trichloroethylene and perchloroethylene in the desired proportions are supplied to sumps 12, for example, by passing the liquid into troughs 44 and permitting the same to run to the floor of chamber 10 through line 50. The heating elements 14 are heated in an appropriate manner to boil and thereby vaporize the liquid. Fan 40 is brought into operation to circulate the mixture of trichloroethylene and perchloroethylene vapors throughout chamber 10.

The pairs of continuous chains 20 are then motivated, for example, by driving one or more pairs of chain guide pulleys 22. Canned goods are loaded on trays 28 as the latter move through the loading station A. The loaded trays pass through the condensation zone, defined by the area of condensing coils 42 in passageway 16, to a position near the bottom of sterilizing chamber 10. The trays are passed back and forth along the major length of chamber 10 to progressively higher levels in the chamber until they reach a position near the top of said chamber, at which point the sterilization of the canned goods is completed.

The trays are then moved from chamber 10, through the condensation zone and under a spray-cooling section where the canned goods on their trays are sprayed with liquid, for example, tap water. The trays are then passed through unloading station B where the cans are removed from the trays.

To avoid carrying of excess moisture back to the sterilization chamber 10, the empty trays are dried by passing the same through a hot air current before being again loaded in the loading station A.

The fan 40 circulates the mixed vapors of trichloroethylene and perchloroethylene to all parts of chamber 10 to avoid any stagnation and consequent differential condensation rates of the vapors of these two substances in different parts of the chamber. A uniform sterilization temperature may thus be established throughout the chamber. The movement of vapors in the chamber 10 is confined to this chamber by baffle 58 to avoid loss of such vapors through the open passageway 16. Diffusion or migration of vapors is minimized by prevention of movement of air currents above the passageway 16. This is accomplished by the provision of a baffle 52 separating the area in which the conveyor is continuously moving into the passageway 16 from the area in which such conveyor is moving from such passageway.

Since it is obvious that many changes and modifications can be made in the above-described details without departing from the nature and spirit of the invention, it is to be understood that the invention is not to be limited to said details except as set forth in the appended claims.

I claim:

1. A process for the cooking and sterilization of canned goods with a hot mixture of trichloroethylene and perchloroethylene vapors which comprises continuously moving said canned goods through a vapor condensation zone open to the atmosphere, into and out of a sterilization zone open to said condensation zone, said sterilization zone containing said mixture in the vapor state substantially at the condensation temperature thereof, continuously forcing said vapors throughout the sterilization zone by heating a mixture of liquid perchloroethylene and trichloroethylene in said zone to convert the same into the vapor state, continuously propelling the vapors in said sterilization zone in a circular path passing alternately through the upper and lower parts thereof at a sufficient velocity to maintain a substantially uniform composition of the vapors throughout the sterilization zone whereby to avoid stagnation and consequent differential condensation rates of said vapors and to establish a substantially uniform temperature throughout said sterilization zone, and preventing material loss of vapors from said condensation zone to the atmosphere.

2. A process for the cooking and sterilization of canned goods with a hot mixture of trichloroethylene and perchloroethylene vapors which comprises continuously moving said canned goods through a vapor condensation zone open to the atmosphere, into and out of a sterilization zone open to said condensation zone, said sterilization zone containing said mixture in the vapor state substantially at the condensation temperature thereof, continuously forcing said vapors throughout the sterilization zone by heating a mixture of liquid perchloroethylene and trichloroethylene in said zone to convert the same into the vapor state, continuously propelling the vapors in said sterilization zone in a circular path passing alternately through the upper and lower parts thereof at a sufficient velocity to maintain a substantially uniform composition of the vapors throughout the sterilization zone whereby to avoid stagnation and consequent differential condensation rates of said vapors and to establish a substantially uniform temperature throughout said sterilization zone, and maintaining substantially total reflux of the trichloroethylene and perchloroethylene to prevent material loss of vapors from said condensation zone to the atmosphere.

3. A process for the cooking and sterilization of canned goods with a hot mixture of trichloroethylene and perchloroethylene vapors which comprises continuously moving said canned goods through a vapor condensation zone open to the atmosphere, into and out of a sterilization zone open to said condensation zone, said sterilization zone containing said mixture in the vapor state substantially at the condensation temperature thereof, continuously forcing said vapors throughout the sterilization zone by heating a mixture of liquid perchloroethylene and trichloroethylene in said zone to convert the same into the vapor state, continuously propelling the vapors in said sterilization zone in a circular path passing alternately through the upper and lower parts thereof at a sufficient velocity to maintain a substantially uniform composition of the vapors throughout the sterilization zone whereby to avoid stagnation and consequent differential condensation rates of said vapors and to establish a substantially uniform temperature throughout said sterilization zone, maintaining substantially total reflux of the trichloroethylene and perchloroethylene to prevent material loss of vapors from said condensation zone to the atmosphere, and preventing substantial movement of air across the top of said condensation zone.

References Cited in the file of this patent

UNITED STATES PATENTS 2,503,193 Cessna _____ Apr. 4, 1950